United States Patent [19]

Lundahl

[11] 3,734,568

[45] May 22, 1973

[54] AIR DELIVERY SYSTEM

[75] Inventor: Ezra Cordell Lundahl, Idaho Falls, Idaho

[73] Assignee: Ezra C. Lundahl, Inc., Logan, Utah

[22] Filed: Nov. 4, 1971

[21] Appl. No.: 195,549

[52] U.S. Cl. ................ 302/47, 302/7, 302/66, 56/DIG. 8, 214/83.28
[51] Int. Cl. ............................................ B65g 53/40
[58] Field of Search .................. 302/58, 56, 47, 51, 302/29, 2, 66, 7; 214/83.28; 56/DIG. 8

[56] References Cited

UNITED STATES PATENTS

| 337,388 | 3/1886 | Fernald et al. | 302/58 |
| 3,556,327 | 1/1971 | Garrison | 302/56 X |
| 2,026,291 | 12/1935 | Trimacco | 56/DIG. 8 |
| 518,843 | 4/1894 | Hinkle | 302/7 |

FOREIGN PATENTS OR APPLICATIONS

| 1,410,260 | 4/1965 | France | 302/58 |
| 120,446 | 7/1958 | U.S.S.R. | 302/58 |

Primary Examiner—Evon C. Blunk
Assistant Examiner—H. S. Lane
Attorney—Lynn G. Foster

[57] ABSTRACT

An air delivery system for particulate material wherein a vacuum is created in an area communicating an intake port with the flow of delivery air and a stream of pressurized air is directed into said area from a point adjacent the intake port to reduce turbulence caused by atmospheric air carrying entrained crop material into said intake port. The system also contemplates gradually expanding the cross-sectional area of the ducts throughout the delivery path to reduce damage to material entrained in the delivery air flow. Both method and apparatus are disclosed.

5 Claims, 3 Drawing Figures

3,734,568

AIR DELIVERY SYSTEM

BACKGROUND

1. Field of Invention

This invention relates to delivery systems and is particularly directed to a pneumatic delivery system for particulate crop material, such as hay or grain.

2. Prior Art

Pneumatic or air delivery systems are frequently employed for delivery of particulate crop material, such as hay or grain, into and out of wagons, trucks, railroad cars, ships, storage elevators, processing plants and the like. Conventionally, in such systems, a high velocity flow of air is established through a duct system extending along the desired delivery route and the particulate crop material to be delivered is introduced into the air flow and is carried thereby to the desired delivery point. Numerous techniques have been employed heretofore for introducing the particulate crop material into the air flow. Some systems have employed mechanical devices for introducing the particulate crop material into the impellers or fans. However, such devices are subject to jamming and wear and require considerable maintenance. Other systems have employed vacuum techniques for drawing the particulate crop material into the air flow. However, the air movement in such systems is generally extremely turbulent with the result that, where hay is being delivered, the leaves are frequently torn from the stems. Thereafter, during ejection of the hay at the delivery point, the leaves and stems become separated, since the stems are considerably heavier than the leaves. As a result, the ratio of leaves to stems varies significantly across the area into which the hay is discharged. Such separation is undesirable since, where the hay is used to feed livestock, the nutritional value of the hay varies with the proportion of leaves. Similarly, where the hay is to be pelletized to produce feed products, a non-uniform product will result. Where grain is being delivered, such turbulence may drive the grain forcibly against the duct which tends to crack the hull of the grain and induce spoilage. Moreover, such turbulence provides non-uniform introduction of the particulate crop material into the air flow and tends to produce clogging of the intake which reduces or blocks the rate at which the particulate matrial is introduced into the air flow.

It is also customary, in prior art air delivery systems, to gradually decrease the cross-sectional area of the duct along the length thereof in order to maintain uniform air pressure throughout the delivery system. However, the reduction in area increases the likelihood of collision between the particulate crop material and the duct and between adjacent particles carried by the air flow. These factors tend to increase the damage to the particulate crop material and stop the free flow of air in an expanding manner.

BRIEF SUMMARY AND OBJECTS OF THE INVENTION

These disadvantages of the prior art are overcome with the present invention and a novel air delivery system is provided whereby turbulence and damage to the particulate crop material are significantly reduced while the quantity of particulate material delivered in a given period of time is increased.

The advantages of the present invention are preferably attained by establishing a high velocity flow of delivery air through a duct, creating a vacuum adjacent the intake end of the duct, introducing pressurized air adjacent the intake end of the duct upstream from the point where the vacuum is created to enhance introduction of particulate crop material into the flow of delivery air, and gradually expanding the cross-sectional area of the duct along the delivery route to reduce damage to the particulate crop material being delivered.

Accordingly, it is an object of the present invention to provide an improved delivery system for particulate material.

Another object of the present invention is to provide an improved pneumatic delivery system with the air impellers not coming in contact with any of the solid crop material entering the air system.

An additional object of the present invention is to provide methods and apparatus for reducing damage to particulate crop material during delivery thereof.

A further object of the present invention is to provide improved methods and apparatus for introducing particulate crop material into an air delivery system.

Another object of the present invention is to provide methods and apparatus for reducing jamming of the intake of air delivery systems by particulate crop material presented for delivery.

A specific object of the present invention is to provide methods and apparatus for delivering particulate material comprising establishing a high velocity flow of delivery air through a duct, creating a vacuum adjacent the intake end of the duct, introducing pressurized air adjacent the intake end of the duct upstream from the point where the vacuum is created to enhance introduction of particulate crop material into the flow of delivery air, and gradually expanding the cross-sectional area of the duct along the delivery route to reduce damage to the particulate crop material being delivered. Thus, always having the entire air system requiring more air or material to fill the vacuum.

These and other objects and features of the present invention will be apparent from the following detailed description, taken with reference to the accompanying drawings.

DETAILED DESCRIPTION OF THE ILLUSTRATED EMBODIMENT

Figure 1:
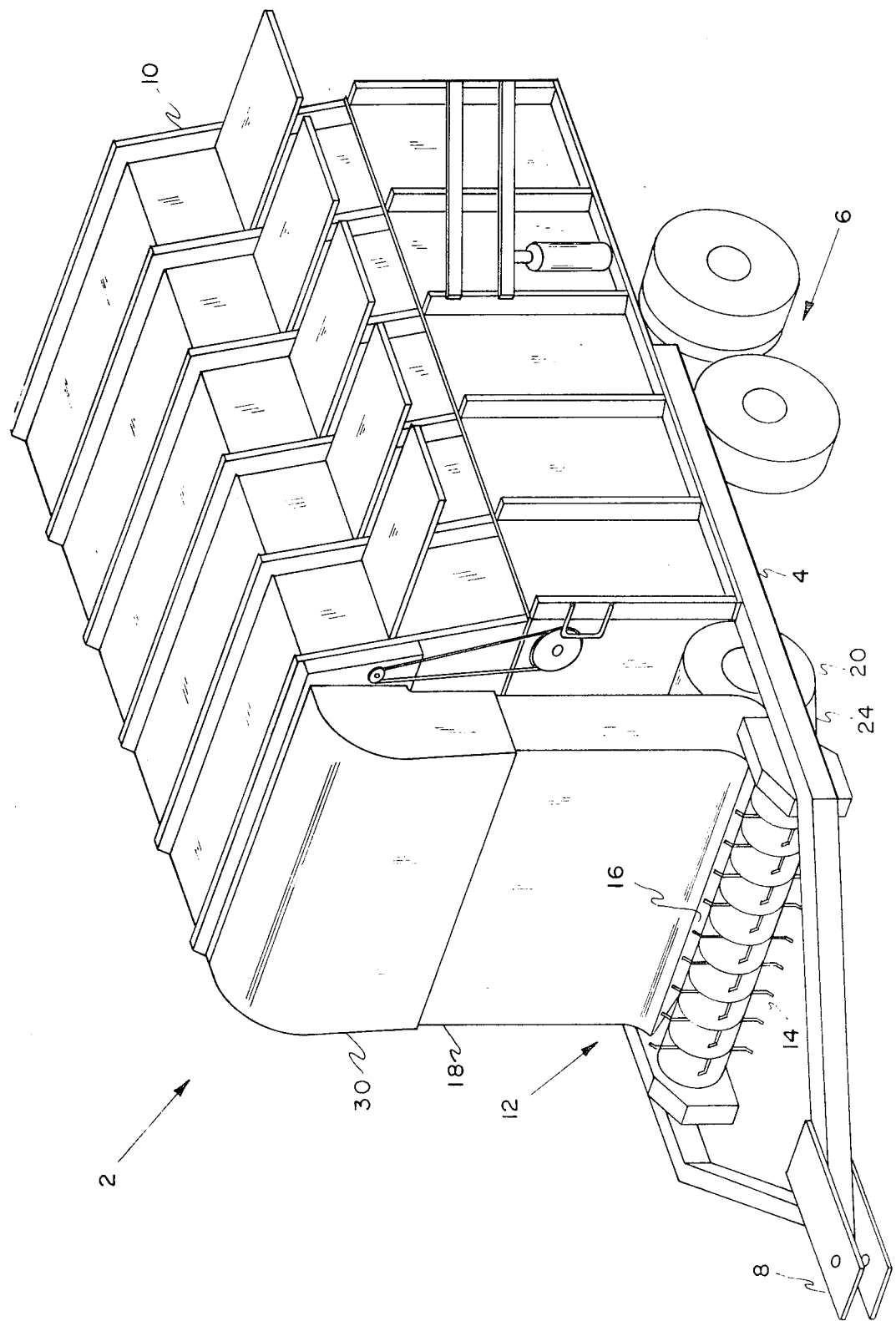
FIG. 1 is an isometric view of a hay wagon embodying the air delivery system of the present invention.
Figure 2:
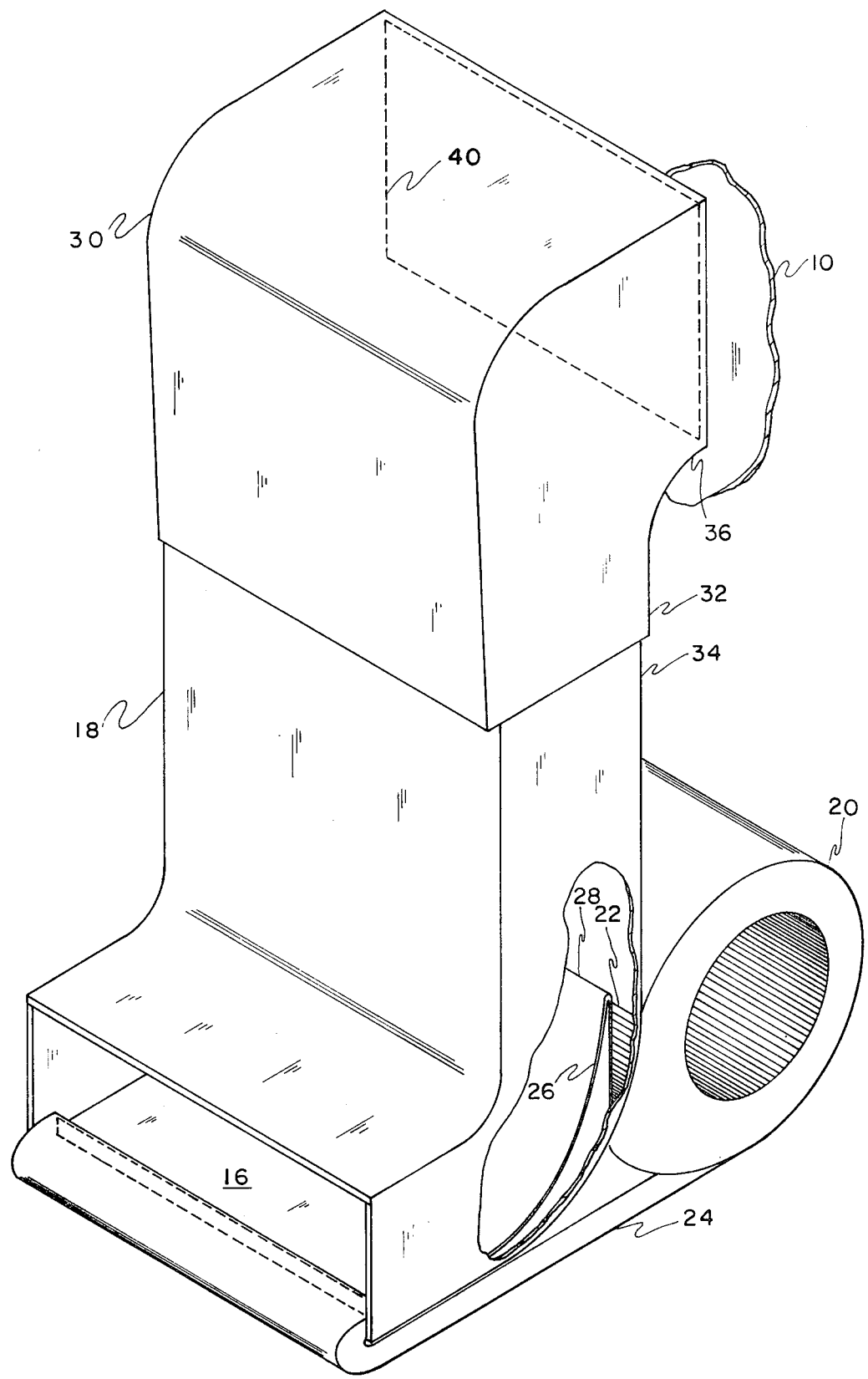
FIG. 2 is a diagrammatic representation of the air delivery system of the wagon of FIG. 1, with parts broken away for clarity.

In that form of the present invention chosen for purposes of illustration in FIGS. 1 and 2, FIG. 1 shows a hay wagon, indicated generally at 2, having a frame 4 carried by a suspension system 6 and formed with a suitable hitch 8 for attachment to a tractor or the like, not shown. A receptacle 10 is mounted on the frame 4 to receive hay delivered thereto by a delivery system, indicated generally at 12. The suspension system 6 is preferably of the type shown and described in my copending patent application, Ser. No. 117,574, filed Feb. 22, 1971. The details of the receptacle 10 are shown and described in my copending patent applications Ser. No. 195,709, filed Nov. 4, 1971, and Ser. No. 195,609, filed Nov. 4, 1971.

The delivery system 12 comprises a rotary rake 14, driven by conventional means, not shown, which picks up hay from the ground and delivers the hay to the intake port 16 of duct 18 which extends completely across the wagon 2. As best seen in FIG. 2, a blower 20 supplies a high velocity flow of delivery air into duct 18 through opening 22 formed in the rear of duct 18 and also delivers a stream of pressurized air through secondary duct 24 to enter duct 18 adjacent intake port 16. A baffle 26 is mounted internally of duct 18 between opening 22 and intake port 16 and serves to produce a Venturi effect which creates a vacuum in duct 18 adjacent end 28 of baffle 26. Upper duct 30 has its lower end 32 dimensioned to fit telescopically about the upper end 34 of duct 18. The walls of upper duct 30 diverge outwardly from end 32 so that the cross-sectional area of duct 30 gradually increases along the length thereof and end 36 of duct 30 is curved to define a delivery port 38 which cooperates with an opening 40 in receptacle 10 to deliver hay to the interior of receptacle 10. Obviously, in some instances, it may be necessary or desirable to interpose one or more intermediate duct sections between the intake duct 18 and the delivery duct 30. Where this is done, it is preferred that each duct section be dimensioned to fit telescopically about the next upstream duct section and that the cross-sectional area of each duct section be gradually increased throughout the length thereof.

In use, as indicated above, baffle 26 serves to create a vacuum within duct 18. Air external to duct 18, at atmospheric pressure, tends to enter intake port 16 to fill this vacuum and serves to carry hay, delivered to intake port 16 by rake 14, into duct 18 and to introduce the hay into the flow of delivery air, supplied by blower 20 through opening 22. In conventional air delivery systems it is found that considerable turbulence is created as the atmospheric air enters duct 18 and hay entrained in the turbulent atmospheric air tends to become entrapped in the intake port 16 and causes jamming of the intake port 16. However, in accordance with the present invention, it is found that, when a stream of pressurized air is introduced into duct 18 adjacent intake port 16 through secondary duct 24, the turbulence is eliminated or considerably reduced and the hay entrained in the atmospheric air is introduced smoothly and rapidly into the delivery air, supplied by blower 20 through opening 22. Because of this, the hay feeds into and through the delivery system 12 at a higher rate than has been possible heretofore. Moreover, jamming of the intake port 16 and damage to the hay is significantly reduced. Damage to the hay is further reduced by gradually increasing the cross-sectional area of the delivery system 12 along the length thereof. This, of course, reduces the velocity of the delivery air flow. However, once the hay is entrained in the flow of delivery air from blower 20, adjacent end 28 of baffle 26 within duct 18, it is found that considerable reduction in the velocity of the delivery air can be tolerated without releasing the hay. Moreover, the reduction of velocity of the delivery air flow reduces the tendency of the delivery air to tear the leaves of the hay from the stems. Moreover, the expansion of the cross-sectional area of the delivery system 12 reduces the likelihood of damage to the hay resulting from collisions between adjacent hay particles or between the hay particles and the walls of the ducts. Furthermore, even where some tearing of leaves from stems does occur, the reduction in the velocity of the delivery air tends to minimize separation during discharge of the hay from the delivery system and, hence, tends to maintain a uniform distrubution of the hay quality throughout the receiving receptacle 10.

Figure 3:
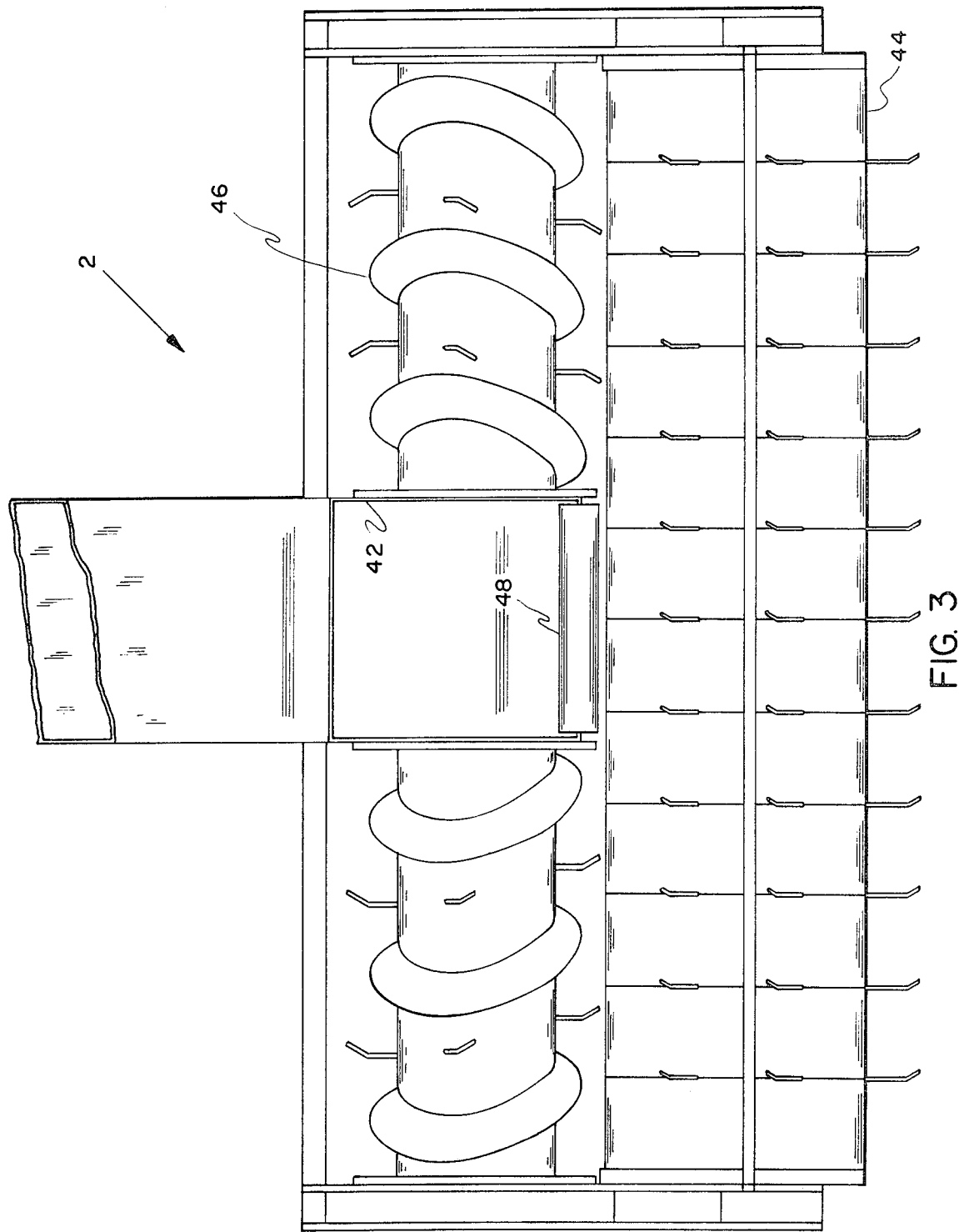
FIG. 3 is the front elevation of an alternative intake mechanism for the air delivery system of FIG. 1.

FIG. 3 illustrates an alternative form of intake for the delivery system of FIG. 1. In this form, the intake port 42 occupies only a relatively small portion of the frontal width of the wagon 2. Hay is picked from the ground by belt rake 44 and is delivered to augers 46 which carry the hay to the intake port 42. Intake port 42 is substantially identical in function to intake port 16 of FIGS. 1 and 2 and pressurized air is supplied to intake port 42 through secondary duct 48 to enhance feeding of hay through intake port 42 in the same manner as described with respect to secondary duct 24 of FIGS. 1 and 2.

Obviously, numerous variations and modifications may be made without departing from the present invention. Accordingly, it should be clearly understood that the forms of the present invention described above and shown in the accompanying drawing are illustrative only and are not intended to limit the scope of the invention.

What Is Claimed Is:

1. A pneumatic crop delivery system comprising: an elongated hollow duct comprising:
   a first horizontally disposed end section having a crop inlet port immediately above, and adapted to receive said crop on the ground;
   a vertically disposed central section;
   a second horizontally disposed end section having an elevated crop outlet port for discharging the crop to a receptacle;
   a common source of pressurized air;
   means for delivering one portion of the pressurized air to the crop inlet port at the bottom thereof;
   means for directing said one air portion generally parallel with and into said first horizontally disposed end section to carry influent crop to the vertically disposed central section;
   means for delivering a second portion of the pressurized air to the lower part of the vertically disposed central section to carry crop received from the first horizontally disposed end section up the central section, along the second horizontally disposed end section, through the crop outlet port and into the receptacle.

2. The system of claim 1 further comprising:
   said duct being formed with the cross-sectional area of the hollow thereof gradually increasing throughout the length of the duct.

3. The system of claim 1 further comprising:
   means for lifting the crop from the ground and delivering the lifted crop to said inlet port.

4. The system of claim 1 wherein:
   said vertically disposed central section of the duct comprises a plurality of hollow components each being dimensioned to fit telescopically in respect to the adjacent end of the next hollow component to allow extension and contraction of the vertically disposed central section through relative displacement of said hollow components without interruption in displacement of crop through the duct.

5. A method of conveying crops from the ground into a wheeled wagon comprising the steps of:
lifting the crop off the ground and directly into a horizontally oriented inlet port of a hollow duct;
introducing pressurized air from a common source into the bottom of the duct at the inlet port in a direction generally parallel to the direction of displacement of the crop through the inlet port;
propelling the crop upon the pressurized air first horizontally ahd thereafter vertically along the hollow of the duct;
introducing additional pressurized air from said source vertically into the intermediate portion of the duct where the crop is being vertically propelled;
carrying said propelled crop upon the additional pressurized air in said vertical direction to a substantially greater elevation and thereafter deflecting the propelled crop and pressurized air in a horizontal direction;
horizontally discharging the crop into a receptacle of the wagon.

* * * * *